Sept. 13, 1960     G. W. GOTTSCHALK     2,952,055
HOT TOP CONSTRUCTION
Filed Oct. 7, 1957
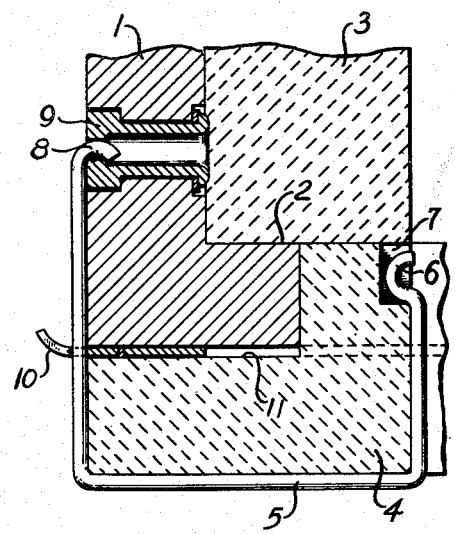
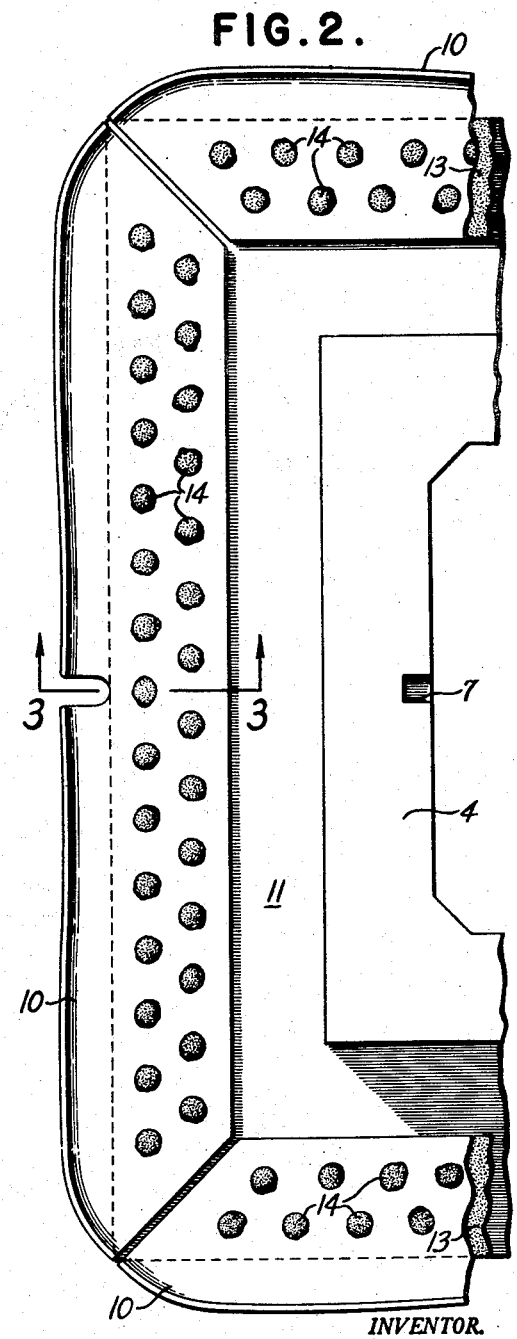
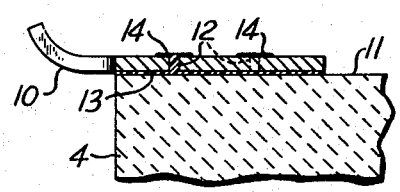
INVENTOR.
GORDON W. GOTTSCHALK
BY
Andrus, Sceales & Starke
Attorneys

United States Patent Office 2,952,055
Patented Sept. 13, 1960

2,952,055
HOT TOP CONSTRUCTION

Gordon W. Gottschalk, Hales Corners, Wis., assignor to Thiem Products, Inc., Milwaukee, Wis., a corporation of Wisconsin Filed Oct. 7, 1957, Ser. No. 688,674

4 Claims. (Cl. 22—147)

This invention relates to a hot top construction and more particularly to an improved method of positioning and attaching a wiper strip to a refractory hot top ring.

A hot top is generally composed of a metal casing having a refractory lining and is disposed within the top of the ingot mold in order to obtain a pool of molten metal above the ingot mold and thereby decrease the piping within the mold itself.

To protect the lower end of the metal casing and to prevent the molten steel ingot from welding to the hot top casing, a refractory hot top ring is secured to the bottom end of the casing and a wiper strip is interposed between the casing and the refractory ring to chill the upward flow of molten metal between the hot top and the mold during pouring.

In the past, the hot top ring and the wiper strip have been made separately and on assembly of the hot top, the wiper strip is manually inserted between the hot top ring and the metal casing. In order to position the wiper strip and prevent inward movement of the strip, a positioning device is usually employed. The positioning device may take the form of a metal tab on the wiper strip which engages a recess in the hot top ring, or positioning members may be embedded in the upper surface of the ring in position to engage the wiper strip as the same is inserted between the metal casing and the ring.

The present invention is directed to an improved hot top ring structure in which the wiper strip is integrally bonded to the ring. With this construction, the wiper strip is accurately positioned with respect to the ring and will be properly located in the hot top assembly. As the wiper strip is formed integrally with the hot top ring, separate handling of the two members is eliminated and the difficulties involved in the insertion of the wiper strip into the hot top assembly are eliminated. Also, the carrying of a separate inventory of wiper strips for each size of refractory ring is eliminated for the steelmaker using hot top ingot molds.

More specifically, the wiper strip of the invention is provided with a series of openings and the strip is bonded to the upper surface of the ring by an adhesive material. The adhesive material penetrates the sand grains of the hot top ring and mushrooms upwardly through the openings in the wiper strip to provide a tight bond between the strip and the ring. The adhesive bond between the wiper strip and the refractory ring serves to accurately position the wiper strip with respect to the ring and eliminates the handling and installation problems connected with the use of a separate wiper strip.

Other objects and advantages of the invention will appear in the course of the following description.

The drawings illustrate the best mode presently contemplated of carrying out the invention.

In the drawings:

Figure 1 is a fragmentary vertical section of the hot top assembly showing the hot top ring structure of the invention;

Fig. 2 is a fragmentary top plan view of the hot top ring and wiper strip; and

Fig. 3 is an enlarged vertical section showing the attachment of the wiper strip to the hot top ring.

The drawings illustrate a hot top assembly comprising a generally cylindrical metal casing 1 provided with an inwardly extending shoulder 2 which supports a refractory lining 3.

To protect the lower end of the metal casing 1, a refractory ring 4 is secured to the casing by a series of wire clamps 5. One end of each of the wire clamps 5 is provided with a bend 6 which is received within a recess 7 formed in the inner surface of the ring 4. The other end of the wire clamp 5 is provided with a hook 8 which is engaged within a socket 9 formed in the metal casing 1. The spring tension provided by the wire clamps 5 serves to firmly hold the hot top ring 4 in engagement with the lower end of the metal casing 1.

To prevent the molten metal in the ingot mold from passing upwardly between the hot top and the mold, a series of wiper strips 10 are inserted between the metal casing 1 and the upper surface 11 of ring 4. The outer edge of the wiper strips 10 extends outwardly and is adapted to engage the inner surface of the ingot mold and thus functions to prevent or delay the upward movement of the molten metal until the metal freezes or solidifies.

According to the invention, the inner portion of each of the wiper strips 10 is formed with a series of holes 12 and an adhesive 13 is employed to secure the wiper strips to the upper surface 11 of ring 4. As best shown in Fig. 3, the adhesive is disposed in a layer between the surface 11 and the wiper strip 10 and extends within the openings 12 in the wiper strip. The adhesive mushrooms upwardly within the holes 12 and the crowns 14 are flattened out to provide a generally smooth upper surface for the wiper strip.

The adhesive penetrates the porous sand composition of the refractory ring 4 and is firmly held to the ring. As the adhesive is disposed within the openings 12 in the strip 10 and is flattened out, as at 14, on the upper surface of the ring, a very firm bond is provided between the wiper strip and the refractory ring 4.

The adhesive material to be employed may take the form of any of the conventional inorganic or organic adhesives or combinations thereof and with or without filler materials. The inorganic adhesives may take the form of sodium silicate, calcium aluminate, oxychloride compounds, such as magnesium oxychloride, metaphosphates, such as zinc metaphosphate, or the like.

The organic adhesive may take the form of phenolic resins, such as the reaction product of phenol and formaldehyde, urea resins, such as the reaction product of urea and formaldehyde, furane resins, such as the condensation product of furfuryl alcohol, melamine resins, such as the reaction product of melamine and formaldehyde, epoxy resins, such as the reaction product of epichlorohydrin and bisphenol, neoprene cements, polyester resins, polyurethane resins, and the like.

A very satisfactory adhesive for use in bonding the wiper strip to the refractory ring is as follows in weight percent:

| | Percent |
|---|---|
| Kaolin | 29.25 |
| Sucrose | 4.85 |
| Sodium silicate (47% solids) | 63.00 |
| Diatomaceous earth | 2.90 |

In fabricating the hot top ring structure of the invention, the wiper strips can be bonded to the ring 4 after the ring has been molded and baked. In this case, the adhesive is preferably applied to both the surface 11 of ring 4 and the undersurface of the wiper strip 10. The wiper strip is then pressed firmly against the refractory ring with the result that the adhesive mushrooms upwardly through the openings 12 in the strip 10. The crowns of the mushroomed adhesive are then flattened by a platen or the like to provide a substantially smooth upper surface for the wiper strip 10. If the particular adhesive to be employed requires heat for curing, the heat can be applied to the platen which then serves the dual capacity of flattening the crowns 14 and curing the adhesive.

Alternately, the wiper strip 10 can be attached to the ring during the casting of the ring itself. In this situation, the wiper strip, having a suitable coating of adhesive, is positioned in the mold or core box and the sand or other refractory material of the ring 4 is then cast into the mold or core box. The refractory material is then baked at an elevated temperature and the heat of the baking opeation can also serve to cure the adhesive material if an adhesive, such as a thermosetting resin, is employed; likewise, the baking temperature will serve to drive the solvents from cements or the water from those adhesives which contain the same.

With the hot top ring construction of the invention, the wiper strip will be accurately positioned with respect to the ring at all times. This substantially reduces the cost of handling and the installation problems connected with the insertion of a separate wiper strip into a hot top assembly.

Various modes of carrying out the invention are contemplated as being within the scope of the following claims particularly pointing out and distinctly claiming the subject matter which is regarded as the invention.

I claim:

1. In a hot top, a casing, a refractory member secured to the casing and formed of particles of refractory material, a wiper member having a first portion thereof located between the casing and the refractory member and having a plurality of openings therein overlapping a surface of said refractory member, said wiper member having a second portion extending outwardly beyond the casing in position to engage the walls of an ingot mold, and an adhesive disposed between the inner portion of the refractory member and the wiper member and extending within said openings, said adhesive serving to tightly bond the wiper member to the particles of the refractory material and to accurately position the wiper member with respect to the casing and the refractory member.

2. In a hot top, a casing, a porous refractory member secured to the casing, a wiper member having a perforated portion located between the casing and the refractory member and having a flexible portion extending outwardly beyond the casing in position to engage the walls of an ingot mold, and an adhesive disposed between the adjacent surfaces of the wiper member and the refractory member, said adhesive penetrating the porous refractory member and extending within the perforations of said perforated portion to the outer surface of said wiper member and disposed on the outer surface of said wiper member bordering the perforations to provide a tight bond between the wiper strip and the refractory member.

3. In a hot top, a casing, a generally porous refractory member secured to the casing, a wiper member having a perforated portion located between the casing and the refractory member and having a flexible portion extending outwardly beyond the casing in position to engage the walls of an ingot mold, and an adhesive joint connecting the wiper member and the refractory member, said joint including a substantially continuous portion extending between the adjacent surfaces of said members and penetrating said porous refractory member and having a series of projecting portions extending within the perforations and having a series of enlarged head portions on the outer surface of said wiper member bordering each of said perforations with said head portions having a substantially greater surface area than the cross sectional area of the corresponding perforations to thereby tightly bond the wiper member to the refractory member.

4. A hot top ring construction, comprising a refractory member formed of integrally bonded sand particles, a wiper member having a first portion disposed flatwise with respect to a surface of the refractory member and having a second portion extending outwardly beyond the refractory member in position to engage the walls of an ingot mold, said first portion having a plurality of openings therein, and an adhesive member disposed between the adjacent surfaces of the refractory member and the wiper member and penetrating between the sand particles of the refractory member and extending within the openings in said wiper member, said adhesive member extending across the outer surface of the wiper member to interlock the wiper member with the refractory member.

References Cited in the file of this patent

UNITED STATES PATENTS

| | | |
|---|---|---|
| 1,921,731 | Charman et al. | Aug. 8, 1933 |
| 2,044,784 | Harshberger | June 23, 1936 |
| 2,071,921 | Dickson | Feb. 23, 1937 |
| 2,080,848 | Charman | May 18, 1937 |
| 2,493,414 | Morrison | Jan. 3, 1950 |
| 2,741,816 | White | Apr. 17, 1956 |
| 2,914,824 | Marcec | Dec. 1, 1959 |